US009226452B2

(12) United States Patent
Biziorek

(10) Patent No.: US 9,226,452 B2
(45) Date of Patent: Jan. 5, 2016

(54) BALING PRESS WITH ADJUSTABLE CONVEYOR CHANNEL FLOOR SEGMENTS

(71) Applicant: Deere & Company, Moline, IL (US)

(72) Inventor: Stephane Biziorek, Gray la Ville (FR)

(73) Assignee: DEERE & COMPANY, Moline, IL (US)

( * ) Notice: Subject to any disclaimer, the term of this patent is extended or adjusted under 35 U.S.C. 154(b) by 302 days.

(21) Appl. No.: 13/947,960

(22) Filed: Jul. 22, 2013

(65) Prior Publication Data

US 2014/0021018 A1 Jan. 23, 2014

(30) Foreign Application Priority Data

Jul. 23, 2012 (DE) .......................... 10 2012 212 846

(51) Int. Cl.
| | | |
|---|---|---|
| A01D 39/00 | (2006.01) | |
| A01F 15/10 | (2006.01) | |
| A01D 90/04 | (2006.01) | |
| B65G 19/04 | (2006.01) | |

(52) U.S. Cl.
CPC ............... *A01F 15/10* (2013.01); *A01D 90/04* (2013.01); *A01F 15/106* (2013.01); *B65G 19/04* (2013.01); *A01F 2015/107* (2013.01); *A01F 2015/108* (2013.01)

(58) Field of Classification Search
USPC ........................................................ 56/341
See application file for complete search history.

(56) References Cited

U.S. PATENT DOCUMENTS

| | | | |
|---|---|---|---|
| 5,819,517 A | 10/1998 | Amanatidis et al. | |
| 6,394,893 B1 | 5/2002 | Scholz et al. | |
| 2001/0042362 A1* | 11/2001 | Scarlett | A01F 15/08 56/10.2 G |
| 2002/0011061 A1* | 1/2002 | Lucand | A01D 90/04 56/341 |
| 2005/0198936 A1* | 9/2005 | Viaud | A01D 90/04 56/341 |
| 2008/0028737 A1* | 2/2008 | Viaud | A01F 17/00 56/341 |
| 2008/0028738 A1 | 2/2008 | Viaud | |

FOREIGN PATENT DOCUMENTS

| | | | |
|---|---|---|---|
| DE | 3025371 A1 | 1/1982 | |
| DE | 19841598 A1 * | 3/2000 | ............. A01D 90/04 |
| EP | 1027821 A2 | 8/2000 | |
| EP | 1574124 | 9/2005 | |
| FR | 2783130 | 3/2000 | |

OTHER PUBLICATIONS

European Search Report for related Application No. EP13176027, dated Nov. 3, 2014.

* cited by examiner

*Primary Examiner* — Alicia Torres

(57) ABSTRACT

A baling press with a conveyor device has a conveyor rotor, a conveyor channel, and a conveyor channel floor. The conveyor rotor and the conveyor channel floor are arranged at a distance to one another in such a way that the distance can be changed and that they delimit, at least partially, the conveyor channel. The distance between the conveyor channel floor and the conveyor rotor can be changed by at least one adjusting device, radial to the rotation axis of the conveyor rotor. In order to improve the quality of the flow of crops, the conveyor channel floor can be subdivided, in the direction of the rotation axis, into at least two floor segments, the distance of which to the conveyor rotor can be changed separately from one another by an adjusting device.

11 Claims, 4 Drawing Sheets

BALING PRESS WITH ADJUSTABLE CONVEYOR CHANNEL FLOOR SEGMENTS

CROSS-REFERENCE TO RELATED APPLICATION(S)

This application claims priority under 35 U.S.C. §119 to German patent application DE 102012212846.8, filed Jul. 23, 2012, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates to baling presses for forming agricultural material into bales, and in particular to conveyors therefor.

BACKGROUND OF THE DISCLOSURE

Conveyor devices, in particular for crops, are used, for example, on harvesting machines, such as baling presses, and are known. With harvesting machines, such as baling presses, in particular, round baling presses, compressed agricultural material or crops are conducted from a crop pick-up device to a conveyor device that comprises a conveyor rotor, in the form of a conveyor roller, which together with a conveyor channel floor, forms a conveyor channel by means of which the crops are conveyed to a pressing chamber. The conveyor channel floor can be designed so it can be adjusted in such a way that the distance to the conveyor rotor can be decreased or increased. In this way, the conveyor channel cross section can be changed so as to avoid or prevent overload situations, which can arise by picking up too large an amount of crops on the conveyor rotor or in the conveyor device. The overload is thereby often detected on the conveyor rotor itself, by, for example, torque sensors, or also by force or pressure sensors on the conveyor channel floor or on adjustment components and used to influence or control the cross section of the conveyor channel.

Such a conveyor device is disclosed, for example, in DE 198 41 598 A1, wherein the conveyor channel floor can be lowered in order to avoid overloads of the conveyor rotor and, in particular, clogging, as early as possible. To this end, torque sensors, electronically controllable means, and an electronic control unit are used to lower the conveyor channel floor as a function of a drive torque acting on the conveyor motor. A maximum drive torque, at which the control begins to intervene, so as to lower the conveyor channel floor, can be prespecified thereby by the operator. This can be disadvantageous in that upon lowering the conveyor channel floor, the entire width of the conveyor rotor is affected so that the crops conveyed into the compressing chamber are affected over the entire width of the conveyor. A reaction to the accumulating crops, partially directed over the width of the conveyor rotor, is not possible. This can lead to density and compression differences in the flow of crops. Furthermore, the conveyance of the crops can be interrupted over a part of or the entire width if the conveyor channel floor should be lowered beyond a certain extent over the entire width. In this way, the compressing operation of the crops would be interrupted or delayed.

SUMMARY OF THE DISCLOSURE

The disclosure provides a conveyor device for a baling press which overcomes the aforementioned problems. More specifically, the disclosure concerns a conveyor device with a conveyor rotor, a conveyor channel, and a conveyor channel floor, wherein the conveyor rotor and the conveyor channel floor are arranged at a distance from one another in such a way that the distance can be changed and delimit the conveyor channel, at least to some extent, wherein the conveyor channel floor can be changed by at least one adjusting device, radial to the rotation axis of the conveyor rotor, at a distance to the conveyor rotor.

In accordance with the disclosure, a conveyor device is constructed in such a manner that the conveyor channel floor is subdivided, in the direction of the axis of rotation, into at least two floor segments, which can be changed, separately from one another, by an adjusting device, at a distance from the conveyor rotor. By a subdivision of the conveyor channel floor into several floor segments, it is possible to open the conveyor channel partially, without influencing the flow of the crops over the entire width of the conveyor rotor. Thus, interruptions in the flow of crops can be avoided. Furthermore, density and compression differences in the flow of crops are minimized, both in the flow direction of crops as well as the transverse direction to it. The subdivision of the conveyor channel floor can be done in two or also in three or more floor segments, wherein, with an increasing number of floor segments, the precision of influencing a flow of crops or a flow of compressed material is increased and thus the quality of the compressing operation, in particular, in a baling press, is optimized. The conveyor channel floor and the floor segments are supported such they can move, so that a distance can be changed relative to the conveyor rotor in the radial direction. A movable support can take place, for example, via an articulation or swivel arrangement, wherein an actuation can take place, in a motor-driven manner, by any adjusting devices or actuators. To this effect, actuation devices with electrical, hydraulic, or also pneumatic actuators or adjusting elements are conceivable.

The conveyor device can comprise sensors with which a load acting on the floor segments or on the conveyor motor can be detected. The sensors can thereby be designed and constructed in such a way that a load acting on the conveyor rotor or on one or more of the floor segments is detected in the form of a torque, a force or a pressure, and processed.

The conveyor device can comprise sensors with which, on the one hand, a load acting on the conveyor rotor can be detected and, on the other hand, the distance of one or more floor segments to the conveyor rotor can be detected. The sensors can thereby be designed and constructed in such a way that a load acting on the conveyor rotor is detected in the form of a torque, a force or a pressure, and processed.

An electronic control unit processes the load signal delivered by the sensors, evaluates it, and generates a corresponding control signal, as a function of the load signal. By means of the control signal, the actuators or adjusting elements can be correspondingly controlled and the bottom segments can be adjusted, wherein with an increasing load signal or when a prespecifiable load signal threshold is exceeded, the corresponding floor segment is opened or removed from the conveyor rotor. Conversely, the floor segment is correspondingly moved so as to be set against it and closed, or is correspondingly moved to the conveyor rotor.

For each floor segment, a separate sensor can be provided. Thus, the sensor can be placed directly on the floor segment and makes possible a direct correlation via changing load conditions. Also, the combination of a load sensor on the conveyor rotor (for example, a torque sensor) with other sensors on the floor segments (for example, distance sensor) is possible and practicable.

Furthermore, for each floor segment, a separate electronic control unit can be provided. The complexity of an electronic control can be kept low in this way.

The actuators can be constructed as hydraulic cylinders, which can be controlled via electromagnetic control valves. However, it is also conceivable to provide electromotor adjusting means, for example, stepping motors, which are controlled directly via the electric control units. Furthermore, the actuators can also be constructed as pneumatic adjustment elements and be controlled via corresponding electromagnetic control valves.

The sensors can be constructed as pressure sensors or torque sensors, so that a pressure acting on the floor segments or a load acting on the floor segments is detected. For example, a pressure sensor can detect the pressure in a hydraulic cylinder connected with the floor segment for its adjustment, which can make an immediate conclusion regarding the force bearing down on the floor segment or regarding the load condition prevailing on the floor segment. Furthermore, a torque detection is also possible with a corresponding sensor on, for example, a swivel joint of a floor segment. By the detection of the torque on the swivel joint, it is likewise possible to detect a load acting on the floor segment.

Another possibility is also produced by the detection of a load acting on the conveyor rotor, for example, by a torque measurement on the conveyor rotor, in combination with distance sensors on the floor segments or the adjusting elements. Upon exceeding a preset limiting load for the conveyor rotor, the closest floor segment(s) found by the distance sensors is/are detected and correspondingly removed from the conveyor rotor until a preset load level has again been set on the conveyor rotor. Upon falling short of the aforementioned limiting load, the floor segments can again be approximated to the conveyor rotor.

The number of floor segments can, of course, be increased so that three or more floor segments can also be placed. The more floor segments provided, the more precise and purposeful it becomes to detect the load conditions being established on the conveyor rotor or on the floor segments and to correspondingly react to them.

A conveyor device in accordance with the type described above can, for example, be used in a baling press to convey and compress agricultural compressed material. This enables as uniform as possible a density and thus form of a bale to be compressed without, for example, the compressing operation having to be interrupted with excessively high load peaks. Furthermore, such a conveyor device can also be provided on, for example, forage harvesters or other equipment or agricultural machines that are provided with a crop pick-up device.

With the aid of the drawing, which shows an example embodiment of the disclosure, the disclosure and additional advantages and advantageous refinements and developments of the disclosure are described below and explained in more detail.

Still other features of the conveyor device and baling press will be apparent from the following description and accompanying drawings.

DETAILED DESCRIPTION

The following describes one or more example constructions of a baling press 10, as shown in the accompanying figures of the drawings described briefly above. Various modifications to the example construction(s) may be contemplated by one of skill in the art.

Figure 1:
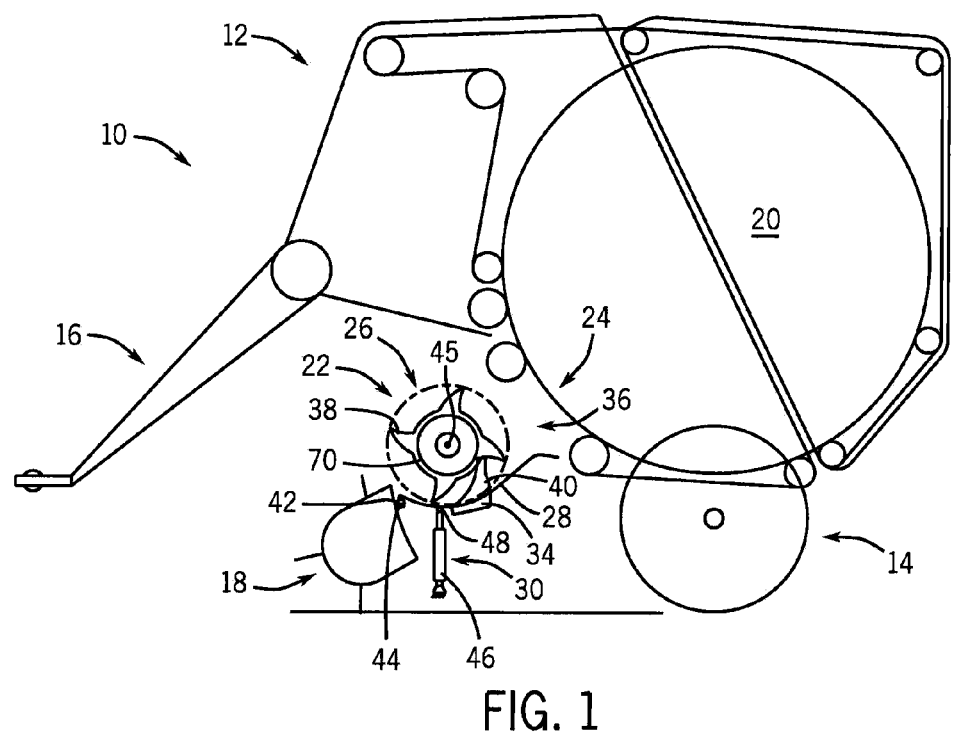
FIG. 1 shows a baling press with a conveyor device in accordance with the disclosure, in a side view and schematic representation, with a conveyor channel floor in a position superior to a conveyor rotor and with a hydraulic cylinder for an adjusting device.

A baling press 10, shown in FIG. 1, is of the usual design—that is, it has a structure 12, a carriage 14, a drawbar 16, a crop pick-up device 18, a compressing space 20, and a conveyor device 22. The baling press 10 is represented as a drawn baling press 10 with a compressing space 20, which can be changed in size; it could also be a self-propelled baling press 10 and/or a compressing space 20 that is constant in size, wherein the type of compressing elements, which are not designated in more detail, is not important. The structure 12 is supported on the carriage 14 and carries the crop pick-up device 18 and the conveyor device 22 and forms the compressing space 20 between side walls, which are not designated in more detail. The carriage 14 contains a rigidly or elastically placed axle and wheels. The drawbar 16 is connected to the structure 12 so it is rigid or can swivel vertically, and is used for the connection with a towing vehicle, for example, a tractor, which is not depicted. The crop pick-up device 18 is also designated as a pick-up and is connected on the structure 12 in a height-adjustable manner, as is likewise known. The compressing space 20 has an inlet 24 for the crops on a front lower area, which connects directly to the conveyor device 22.

The conveyor device 22 can be connected rigidly or in a movable manner with the crop pick-up device 18 or the structure 12 and contains, among other things, a conveyor rotor 26, a conveyor channel floor 28, adjusting devices 30, and, in this example embodiment, a hydraulic arrangement 32 for the adjusting devices 30 (see FIG. 4) and a cutting device 34. The conveyor device 22 has the task of picking up crops brought by the crop pick-up device 18 and to convey them, cut or uncut, to the compressing space 20. Depending on the nature of the crops themselves or the density of the crop flow, there is always the danger of clogging, which is preceded by an increased pressure on the conveyor channel floor 28. The area between the crop pick-up device 18, the inlet 24, the conveyor channel floor 28, the conveyor rotor 26, and the nondepicted side walls shows a conveyor channel 36.

Figure 2:
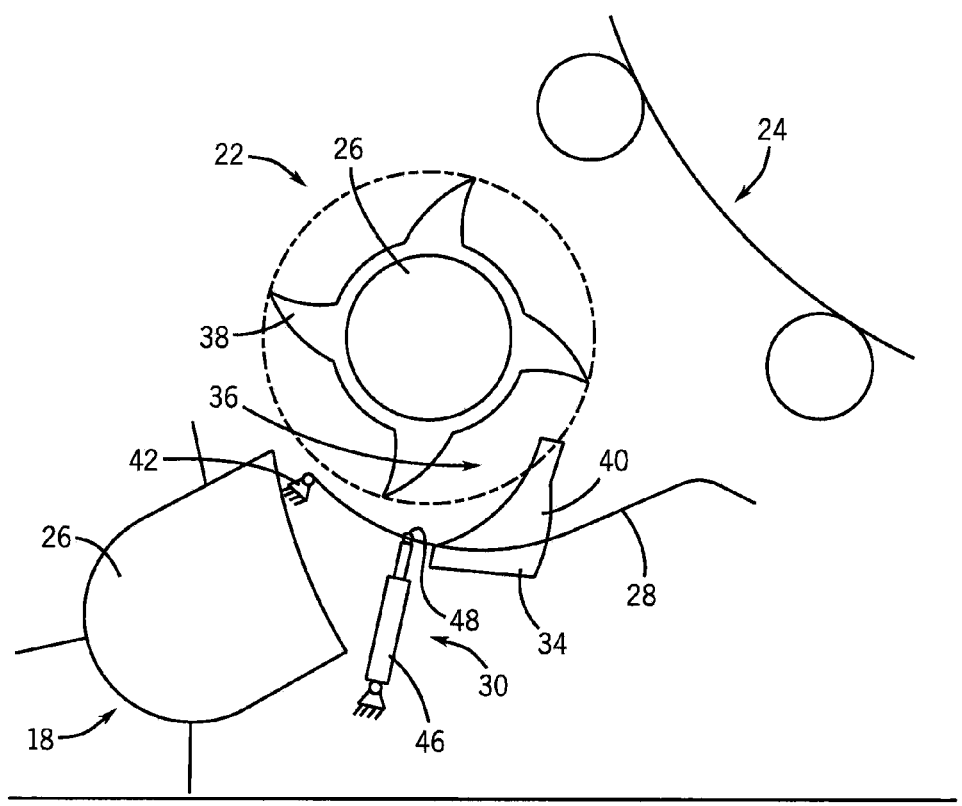
FIG. 2 shows the conveyor device from FIG. 1, with a conveyor channel floor in a position swiveled away, in part, from the conveyor rotor.

The conveyor rotor 26 can be driven in both directions and has entrainers 38, which convey the crops and press them onto blades 40 of the cutting device 34, if such are present. In the position of the conveyor channel floor 24, in accordance with FIGS. 1 and 2, the entrainers 38 extend up to close to them.

The conveyor channel floor 28 extends between the crop pick-up device 18 and the inlet 24 and essentially follows the circumference of the conveyor rotor 26 to approximately one-fourth of its circumference. Whereas the drawing shows an undershot conveyor device 22, the disclosure could be used just as well on an overshot conveyor device 22. The conveyor channel floor 28 is subdivided, in the transverse direction to the baling press 10 or in the longitudinal direction to the conveyor rotor 26 (in the direction of the axis of rotation of the conveyor rotor 26), into three floor segments 28', 28", 28'", wherein a swivel bearing 42 is located on the floor segments 28', 28", 28'", each on the side of the conveyor channel floor 28, remote from the conveyor rotor 26, on the end area facing the crop pick-up device 18 (see FIG. 4).

In this example embodiment, one finds the swivel bearing 42 on a carrier 44. The swivel bearing 42 is used as a swiveling suspension of the individual floor segments 28', 28", 28'" of the conveyor channel floor 28, wherein each floor segment 28', 28", 28'" is supported such that it can swivel around a swiveling axis 45, located on the swivel bearing 42 (see FIG. 4). Furthermore, the adjusting devices 30, in the form of hydraulic cylinders 46', 46", 46'", are located downstream from the swivel bearing 42, wherein each point of articulation 48', 48", 48'", located downstream from the swivel bearing 42, is connected with the individual floor segment 28', 28", 28'" of the conveyor channel floor 28. By adjusting the adjusting devices 30, the conveyor channel bottom 28 or the floor segments 28', 28", 28'" of the conveyor channel floor 28 can swivel on the swivel bearing 42 or rotate around the swivel axis 45, and the conveyor channel floor 28 is thus changed in distance, essentially radial to the conveyor rotor 26.

The conveyor channel floor 28 or the floor segments 28', 28", 28'" can be provided with slots, which are not depicted, through which the blades 40 can be extended.

The adjusting devices 30 in this example embodiment are constructed with double-acting hydraulic cylinders 46', 46", 46'", whose piston rod-side ends act on the individual points of articulation 48', 48", 48'", whereas the piston bottom-side ends are connected to the structure 12. The adjusting devices 30 essentially extend in a perpendicular manner and are connected to the hydraulic arrangement 32. The hydraulic circle 32 is shown only in FIG. 4, solely for the sake of simplicity, but, otherwise, is always contained in this example.

Figure 4:
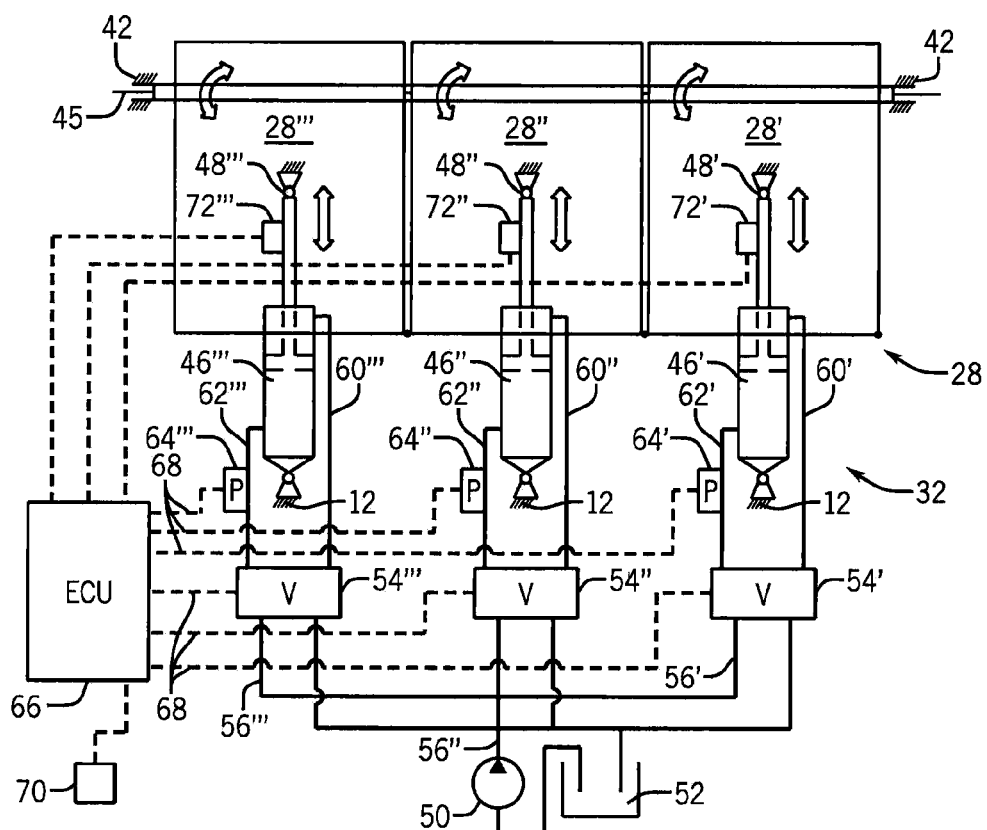
FIG. 4 is a schematic representation of a hydraulic circulation for an electrohydraulically controllable adjusting device with hydraulic cylinders from FIG. 1.

The hydraulic arrangement 32 is constructed in accordance with FIG. 4. In addition to the aforementioned hydraulic cylinders 46', 46", 46'", it comprises a hydraulic pump 50, a hydraulic tank 52 and control valves 54', 54", 54'". Furthermore, the control valves 54', 54", 54'" are connected with the hydraulic pump 50 via first hydraulic supply conduits 56', 56", 56'" and with the hydraulic tank 52, via second hydraulic supply conduits 58', 58", 58'". Moreover, the hydraulic cylinders 46', 46", 46'" are connected with the control valves 54', 54", 54'" via a piston rod-side hydraulic conduit 60', 60", 60'" and via a piston bottom-side hydraulic conduit 62', 62", 62'". As control valves 54', 54", 54'", it is possible to use electromagnetically controllable valves (for example, 2/2-control valves), wherein the use of control valves with intermediate positions or proportional valves is advantageous (but not obligatory). Pressure sensors 64, 64", 64'", which signal a pressure prevailing in the piston bottom chamber of the individual hydraulic cylinder 46', 46", 46'", are located on the piston bottom-side hydraulic conduits 62', 62", 62'". Moreover, the hydraulic arrangement 32 comprises an electronic control unit 66, which is used to control the control valves 54', 54", 54'" or to detect sensor signals and a corresponding generation of control signals. The electronic control unit 66 is connected both with the control valves 54', 54", 54'" and also with the pressure sensors 64', 64", 64'", via electric control conduits 68. Furthermore, the electronic control unit 66 has a data storage unit in which corresponding control data are deposited in the form of threshold values or limiting values and control algorithms, so that a closed control loop can be implemented, which enables a regulation or control of the load conditions on the conveyor rotor 26 or on the floor segments 28', 28", 28'".

In view of the foregoing, the result is the following function, proceeding from a normal operational state, as is shown in FIG. 1.

Figure 3:
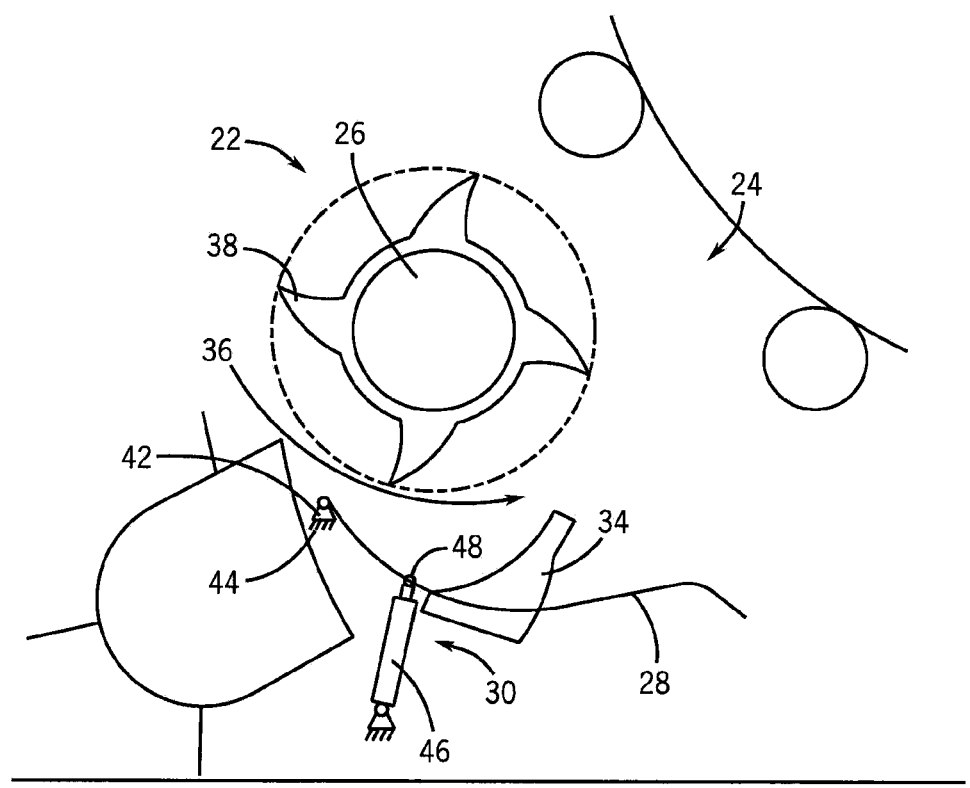
FIG. 3 shows the conveyor device from FIG. 1, with a conveyor channel floor in a position completely swiveled away from the conveyor rotor.

In accordance with FIG. 1, the conveyor channel floor 28 is in a position superior to the conveyor rotor 26. In a case in which such a large amount of crops arrives at the conveyor channel 36 and is compressed by the conveyor rotor 26 against the conveyor channel floor that the load conditions on the conveyor rotor or on the conveyor channel floor exceed a permissible limiting load, this is pressed out by a corresponding rise in pressure in one or more of the hydraulic cylinders 46', 46", 46'". The pressure in the hydraulic cylinders 46', 46", 46'" is signaled by corresponding pressure signals of the pressure sensors 62', 62", 62'". If the pressure should exceed a prespecified limiting pressure stored in the electronic control unit, then a control signal is generated, which causes a corresponding control of the control valves 54', 54", 54'" and a readjustment of the hydraulic cylinders 46', 46", 46'" until the aforementioned limiting pressure is again reached or until it falls short of that limiting pressure. The affected floor segment 28', 28", 28'" (under certain circumstances, all floor segments 28', 28", 28'") is correspondingly moved away from the conveyor rotor 26 and moved to a position that is swiveled away or partially swiveled away, in accordance with FIG. 2 or 3. Depending on the crop flow, there may be an exceeding of the limiting load on the conveyor rotor 26 by a partial accumulation along a rotation axis 45, wherein, then, a readjustment can partially take place by a corresponding control of only the floor segment 28', 28", 28'" affected by the accumulation, so that the nonaffected area in the crop flow remains uninfluenced and, nevertheless, the load on the conveyor rotor 26 is reduced. By the control of individual floor segments 28', 28", 28'" as a reaction to exceeding the load on the conveyor rotor 26, density or compression differences in the crop flow are minimized. Also, an interruption and delay of the crop flow is prevented and, ultimately, the compression quality and compression performance of the baling press is improved. A corresponding increase in the number of floor segments 28', 28", 28'" (for example, to 4, 5, or more floor segments) is likewise conceivable, wherein this effect can be reinforced even more.

In another example embodiment, it is also possible to provide, for example, a torque sensor 70 (or another suitable load sensor) on the conveyor rotor 26, in combination with distance sensors 72', 72", 72'", instead of the pressure sensors 64', 64", 64'" on the hydraulic conduits 62', 62", 62'". The distance sensor 72', 72", 72'" can be located on the floor segments 28', 28", 28'" or on other components that are connected with them and can deliver a corresponding distance signal, for example, to the adjusting devices 30. In this embodiment, a load signal can, via the torque sensor 70, detect the load on the conveyor rotor and signal. The control unit 66 simultaneously detects the distances of the individual floor segments 28', 28", 28'". Upon exceeding the permissible limiting load, the floor segment 28', 28", 28'", closest to the conveyor rotor is correspondingly controlled and removed from the conveyor rotor 26 until the load again falls short of the limiting load. Under certain circumstances, several or all of the floor segments 28', 28", 28'" are readjusted or controlled.

For both example embodiments, it is possible that when a minimal load, minimum load, or reference load on the conveyor rotor 26 (the aforementioned load sizes are correspondingly deposited in the electronic control unit) is exceeded, the floor segments 28', 28", 28'" are also correspondingly readjusted or controlled and are moved to the conveyor rotor 26. In this way, by regulating the load lying close to or acting on the conveyor rotor 26, a performance optimization of the baling press can be attained, so that a maximum utilization of the baling press 10 is attained and the load on the conveyor rotor is always maintained and regulated between a minimal load and a limiting load.

The foregoing detailed description describes the subject of this disclosure in one or more examples. A skilled person in the art to which the subject matter of this disclosure pertains will recognize many alternatives, modifications and variations to the described example(s). The scope of the invention is thus defined not by the detailed description, but rather by the following claims.

What is claimed is:

1. A conveyor device for crops, comprising: a conveyor rotor, a conveyor channel, and a conveyor channel floor, wherein the conveyor rotor and the conveyor channel floor are located at a distance to one another in such a way that the distance can be changed and that they delimit the conveyor channel at least partially, wherein the distance between the conveyor channel floor and the conveyor rotor can be changed by at least two adjusting devices, radial to the rotation axis of the conveyor rotor, wherein the conveyor channel floor is subdivided in the direction of the rotation axis into at least two floor segments, the distance of which to the conveyor rotor, separately from one another, can be changed by the at least two adjusting devices, respectively.

2. The conveyor device according to claim 1, further including one or more sensors that can detect a load acting on the floor segments or on the conveyor rotor.

3. The conveyor device according to claim 1, further including one or more sensors that can detect a load acting on the conveyor rotor at a distance to the floor segments relative to the conveyor rotor.

4. The conveyor device according to claim 1, further including one or more sensors and at least one electronic control unit for processing a load signal delivered by the sensors and controlling the at least two adjusting devices as a function of the load signal.

5. The conveyor device according to claim 1, further including a sensor for each floor segment.

6. The conveyor device according to claim 5, further including an electronic control unit for each floor segment.

7. The conveyor device according to claim 1, wherein the at least two adjusting devices have actuators that are constructed as hydraulic cylinders controlled via electromagnetic control valves.

8. The conveyor device according to claim 1, further including one or more sensors that detect at least one of pressure and torque.

9. The conveyor device according to claim 1, further including one or more sensors that detect at least one of torque and distance.

10. The conveyor device according to claim 1, wherein the conveyor channel floor is subdivided into at least three floor segments.

11. A baling press for the compression of compressed agricultural material including a conveyor device according to claim 1.

* * * * *